United States Patent Office 2,986,559
Patented May 30, 1961

2,986,559
NOVEL THERAPEUTIC SALTS AND PROCESSES FOR THEIR MANUFACTURE

William S. Benica, Montclair, N.J., assignor to Schering Corporation, Bloomfield, N.J., a corporation of New Jersey No Drawing. Filed Jan. 7, 1959, Ser. No. 785,334

18 Claims. (Cl. 260—239.5)

This invention relates to a new group of compounds which have important therapeutic properties. More particularly, this invention relates to phenothiazinyl alkylamine salts of acid esters of adrenocortical substances.

I have found that by judicious combination of an acid ester of an adrenocortical with a phenothiazinyl alkylamine, there is produced a new chemical entity which offers many advantages over a mere physical combination.

My novel compounds may be considered as a tripartite chemical combination of a clinically effective anti-inflammatory corticosteroid esterified at the 21-hydroxyl group in a 1:1 molecular ratio with a polybasic acid, the free acid group of which is bound in salt formation with a clinically effective tranquilizing phenothiazinyl alkylamine. Representative of the steroid moiety are clinically effective corticosteroids such as cortisone, hydrocortisone, prednisone, prednisolone, their 9α-fluoro analogs, their 6α-methyl analogs, their 16α- and 16β-methyl analogs, their 16α-hydroxy-9α-fluoro analogs and their 16-methyl (α and β)-9α-fluoro analogs. Representative of the phenothiazinyl alkylamine moiety are the clinically effective phenothiazines which contain at the 2-position a member of the group consisting of hydrogen, halogen, lower alkanoyl and trifluoromethyl and at the 10-position, a tertiary amino alkyl group; the alkyl preferably being propyl and the tertiary amino group being a lower dialkylamino (e.g. dimethylamino) or piperazino, the latter preferably substituted on the second hetero atom by hydroxyethyl, lower alkyl or lower alkanoyloxyethyl. Examplary of such phenothiazinyl alkylamines are promazine [10(3 - dimethylaminopropyl)phenothiazine], chlorpromazine [2-chloro - 10(3-dimethylaminopropyl)phenothiazine], trifluoromethylpromazine [2-trifluoromethyl-10-(3-dimethylaminopropyl)phenothiazine], perphenazine [1-(2 - hydroxyethyl) - 4 - [3-(2-chloro-10-phenothiazinyl)-propyl]piperazine], trifluoromethylperphenazine [1-(2-hydroxyethyl) - 4 - [3-(2-trifluoromethyl-10-phenothiazinyl-propyl] piperazine], 2 - acetylperphenazine [1-(2-hydroxyethyl) - 4-[3-(2-acetyl-10-phenothiazinyl)-propyl] phenothiazine], the acetate esters of the aforementioned hydroxy compounds prochlorperazine [1-methyl - 4-[3-(2-chloro-10-phenothiazinyl)propyl] piperazine], its 2-trifluoromethyl analog and 2-acetyl analog, and the like.

Representative of the dibasic acid moiety are those derived from dicarboxylic acids such as succinic and maleic; dibasic organic acids such as sulfobenzoic and sulfoacetic; and polybasic inorganic acids such as phosphoric and sulfuric.

The novel compounds of my invention are useful in the treatment of steroid responsive diseases which are accompanied by stress overlay. They are thus valuable in the treatment and control of rheumatoid arthritis, fibrositis, busitis and other anxiety-complicated disorders as well as refractory allergic conditions. In the veterinary field, my novel compounds, especially the perphenazine salt of prednisolone hemisuccinate, have been advantageously employed in the treatment of ketosis and inflammatory conditions in cattle. Stress conditions in small and large animals brought about by surgery, trauma, or infectious diseases have been ameliorated by use of my preferred species.

The advantages of employing a compound of my invention over a single physical mixture of corticoid and tranquilizer are numerous. In the treatment of large animals, such as cattle, medication is preferably administered parenterally via injection. Unfortunately, parenteral preparations containing corticosteroid and phenothiazine tranquilizer in admixture, either in solution or suspension, are unstable. For example, an aqueous suspension of prednisolone and perphenazine rapidly decomposes so that the preparation becomes unsuitable for its intended purpose. My novel compounds, on the other hand, are perfectly stable chemical entities and thus can be compounded into pharmaceutical dosage forms without danger of decomposition. For example, an aqueous suspension of the perphenazine salt of prednisolone hemisuccinate maintains its chemical identity and potency long after a mixture of prednisolone and perphenazine has decomposed into unidentifiable impotent products. The stability of the product thus permits the manufacture and use of a single preparation containing both the corticosteroid and tranquilizer components. Heretofore, the treatment of ketosis, especially the nervous form of bovine ketosis, it has been necessary to administer two separate injections to the animal; one containing glucose or a corticosteroid such as prednisolone, and the other containing a sedative. Sometimes the sedative is administered orally such as in the case of chloralhydrate. Double injection inherently caused additional stress in the animal patient. My novel compositions by their very nature provide both active ingredients in utilizable form in a single dosage unit.

More important than elimination of a second simultaneous or consecutive injection, it appears that each portion of my novel chemical entities exerts a pharmacological potentiation upon the other. The dual action of the salt is auto-potentiated to the extent that a therapeutic dose contains approximately one-half of the therapeutic dose of each component, if administered separately. For example, in the treatment of bovine ketosis, a generally employed regimen has been the intramuscular administration of 100-200 mg. of prednisolone followed by 100-200 mg. of perphenazine or other sedatives such as chloralhydrate. Such dose regimen provides for approximately 75% recovery within an acceptable time period. Surprisingly, when the perphenazine salt of prednisolone 21-hemisuccinate is employed, a dose corresponding to approximately 50 mg. of corticoid and 50 mg. of phenothiazine derivative provides for a similar, if not more favorable response.

It is thus apparent that my novel compounds have at least a threefold advantage over the combinations of the present and prior art; namely (1) stable single chemical entity providing dual action, (2) single dose administration, and (3) potentiation resulting in lower dosage.

Although I have found that essentially any combination of therapeutically active corticoid with a therapeutically active phenothiazinyl alkylamine will possess chemical stability, in order to gain maximum therapeutic benefit, it is preferred that judicious combination of corticoid moiety and phenothiazine moiety be employed. Since the corticoid and the phenothiazinyl moieties exist in my novel salts in an equimolecular ratio, the preferred compounds are, therefore, those which have combined approximately equal therapeutic dosages. For example, the proper combination consists of a high potency (low dose) corticoid with a high potency (low-dose) tranquilizer or a low potency (high dose) corticoid with a low potency (high dose) tranquilizer. Since the corticoid and the phenothiazinyl alkylamine are in the same molecular weight range, the ideal compound consists of a corticoid having a particular optimum therapeutic dose in combination with a phenothiazinyl alkylamine having more or less the same therapeutic dose. Thus, the high dose tranquilizers, such as chlorpromazine and promazine (whose recommended dose is about 50 mg.) are most advantageously combined with cortisone or hydrocortisone. On the other hand, low dose tranquilizers such as perphenazine, or prochlorperazine, whose optimum therapeutic doses are approximately 5 mg. and 10 mg., respectively, are advantageously combined with corticoids such as prednisone, prednisolone, 6-methylprednisolone, triamicinolone and the like, whose dose regimen is in the range of 4–5 mg. The more potent phenothiazines such as trifluoromethylperphenazine are advantageously combined with corticoids such as 16α-methyl-9α-fluoroprednisolone and the like.

In selecting the corticoid and phenothiazinyl alkylamine, little attention need be made with regard to the dibasic acid bridge. Any non-toxic pharmaceutically acceptable dibasic acid radical having a molecular weight below about 200 may be advantageously employed. I prefer relatively low molecular weight acids such as succinic so as to avoid "loading" the molecule with matter which does not contribute therapeutically.

My novel compounds may be represented by the empirical formula:

$$St—A—B$$

wherein St—A represents a 21-hemiester of a 21-hydroxysteroid of the group selected from cortisone, hydrocortisone, their 9α-fluoro analogs, 6α-methyl analogs, 9α-fluoro-16α-hydroxy analogs, 16α- and 16β-methyl analogs, 16α- and 16β,9α-fluoro analogs, and the $\Delta^1$-dehydro analogs of all the foregoing, with a polybasic non-toxic pharmaceutically acceptable acid. B represents a 10-phenothiazinylpropylamine which is substituted at the 2-position by a member of the group consisting of hydrogen, halogen, lower alkanoyl and trifluoromethyl and wherein the amine is a tertiary amine of the group represented by lower dialkylamine and piperazino, including substituted piperazino such as hydroxyethyl-piperazino, methyl-piperazino, acetoxyethylpiperazino.

Schematically my novel salts may be represented by the following structural formula including the 1,2-dihydro analogs of the steroid component:

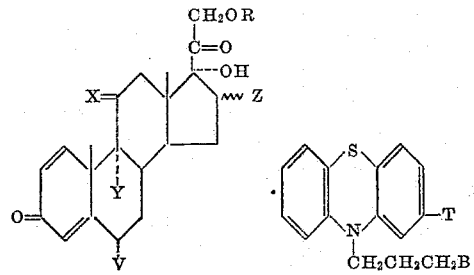

wherein R is a polybasic acyl radical having a free acid group selected from the group of acids consisting of phosphoric, sulfuric, and carboxylic acids having up to 8 carbon atoms, X is a member of the group consisting of O and (H, βOH), Y is a member of the group consisting of hydrogen and fluorine, V and Z are dissimilar members of the group consisting of methyl and hydrogen, Z including in its scope α-hydroxyl when Y is fluorine, T is a member of the group consisting of hydrogen, halogen, lower alkanoyl, and trifluoromethyl, B is an amino radical of the group consisting of lower dialkylamino, N-methylpiperazino, N-hydroxyethylpiperazino, and N-acetoxyethylpiperazino.

The novel compounds of my invention may be prepared simply by admixing a 21-hemiester of a corticoid with a particular phenothiazinyl alkylamine in a solvent from which the salt to be formed will either crystallize or precipitate. Since the salts are essentially insoluble in water, the reaction solution or mixture may be rendered aqueous to effect or complete the salt formation. For example, prednisolone hemisuccinate upon admixture in equimolar quantities with perphenazine in warm methanol, followed by the addition of cold water, yields the perphenazine salt of prednisolone hemisuccinate in substantially pure form and quantitative yield. Alternatively, a soluble salt of a 21-hemiester of a corticoid upon admixture with an equivalent quantity of a soluble salt of a phenothiazinyl alkylamine will yield a double decomposition salt of this invention. For example, prednisone hemisuccinate and sodium carbonate, in stoichiometric quantities are preferably dissolved in sufficient water to make a dilute solution (5–10%). A separate solution of perphenazine in 0.1 N-hydrochloric acid (sufficient to form a monohydrochloride) is prepared. The two solutions are mixed and the resultant precipitate consists of the perphenazine salt of prednisone hemisuccinate.

The 21-hemiesters may be prepared by analogous methods described in the scientific or patent literature. For example, phosphate esters may be prepared by the method described in U.S. Patent 2,789,117 or 2,779,775. Similarly, hemiesters with lower alkanoyl dibasic acids are prepared according to methods described for analogous substances such as hydrocortisone 21-hemisuccinate. Esters such as the sulfobenzoic and sulfoacetic are prepared according to the methods described in co-pending application of Hershberg et al., Serial No. 693,046, filed October 29, 1957 (e.g. by the interaction in an inert solvent of a sterol containing an esterifiable hydroxyl group at the 21-position with either the free sulfonic-carboxylic diacid, the diacid dichloride or the diacid anhydride).

The phenothiazinyl alkylamines are prepared by methods also described in the domestic and foreign scientific and patent literature.

My novel salts and especially the perphenazine salt of prednisolone hemisuccinate are particularly adaptable to parenteral formulations since they do not undergo decomposition. They, however, may be incorporated into other dosage forms such as tablets, elixirs, syrups and the like. The following examples are illustrative of methods of manufacture of my novel compounds and of dosage forms into which they may be incorporated. My invention is not limited thereby, however, by only as defined in the appended claims.

EXAMPLE 1

*Perphenazine salt of prednisolone 21-hemisuccinate*

A. Equimolar quantities of perphenazine and prednisolone hemisuccinate are dissolved in ten volumes of methanol. The mixture is warmed to about 40° C. to effect solution. To the warm solution is slowly added three volumes of cold water while rapidly stirring the reaction mixture. The salt of this example precipitates and is removed by filtration. The salt is washed with ice-cold methanol and dried in vacuo at low heat (about 40° C.).

B. Stoichiometric quantities of prednisolone hemisuccinate and sodium carbonate are dissolved in sufficient water to make a five percent solution. A separate solution is made of perphenazine in sufficient 0.1 N hydrochloric acid to form the mono-hydrochloride. The solutions are cooled and equimolar quantities are mixed under vigorous stirring. The salt which precipitates is removed by filtration, washed with water and dried, as above, in vacuo under low heat.

By following the foregoing procedures and making the appropriate substitutions, the perphenazine salts of 21-hemisuccinate esters of the following corticoids are prepared: prednisone, 9α-fluoro-prednisone, 9α-fluoroprednisolone, 16α-methylprednisone, 16α-methylprednisolone, 16β-methylprednisone, 16β-methylprednisolone, the 9α- fluoro analogs of the aforementioned 16-methylpregnadienes, 6α-methylprednisone, 6α-methylprednisolone, and triamcinolone.

In order to prepare the 21-hemisuccinate used as a starting material, the following procedure is applicable: A solution of 3 grams of a corticoid having a free 21-hydroxyl group (for example, prednisone) in 15 ml. of a tertiary organic base (such as pyridine or quinoline) is treated with 1 gram of succinic anhydride. The mixture is stirred overnight at room temperature and then poured, while stirring, into 200 ml. of cold 2 N sulfuric acid. The hemi ester precipitates and is removed by filtration washed with water and dried in vacuo. The ester is purified by recrystallization from alcohol.

EXAMPLE 2

*Prochlorperazine salt of prednisone 21-o-sulfobenzoate*

Prednisone 21-o-sulfobenzoate is prepared as described in copending application of Hershberg and Gould, Serial No. 693,046, filed October 29, 1957.

By substituting prednisone 21-o-sulfobenzoate for prednisolone hemisuccinate and prochlorperazine for perphenazine in Example 1, the salt of this example is obtained.

By analogous procedures, there is obtained prochlorperazine salts of 21-sulfobenzoates of the following: prednisolone, 9α-fluoroprednisolone, 16α-methylprednisolone, 6α-methylprednisolone, 16β-methylprednisolone, 16α-methyl-9α-fluoroprednisolone, 16β-methyl-9α-fluoroprednisolone, and their 11-keto analogs.

EXAMPLE 3

*Chlorpromazine salt of hydrocortisone 21-dihydrogen phosphate*

Hydrocortisone 21-dihydrogen phosphate and chlorpromazine are substituted for the reactants of Example 1 yielding the compound of this example. In like manner there is obtained chlorpromazine and promazine salts of 21-dihydrogen phosphates of the following: hydrocortisone, cortisone, 9α-fluorohydrocortisone, 9α-fluorocortisone.

By the processes described herein the following salts are prepared which are exemplary of my invention: perphenazine salt of prednisolone 21-dihydrogenphosphate, prednisolone 21-o-sulfobenzoate, prednisolone 21-sulfoacetate, prednisolone 21-maleate, prednisolone 21-hemiphthalate, the 11-keto analogs thereof, the 9α-fluoro analogs of the foregoing and the 1,2-dihydrogeno analogs.

*Dosage forms*

A. Injectable: Mg./ml.
Perphenazine salt of prednisolone. hemisuccinate (PPH) _____mg__ 10.0
Sodium carboxymethylcellulose (CMC)__mg__ 0.5
Benzyl alcohol, N.F. _____mg__ 9.0
Sodium chloride, U.S.P. _____mg__ 7.0
Water for injection, U.S.P., q.s. _____ml__ 1.0

The sodium carboxymethylcellulose, benzyl alcohol and sodium chloride is mixed in 90% of the total volume of water. The solution is autoclaved and there is dispersed therein the steroid salt. The mixture is diluted with water to the proper volume.

B. Tablets: Mg. per tablet
PPH _____ 10.0
Lactose, U.S.P. _____ 153.1
Cornstarch, U.S.P. _____ 8.4
Gelatin, U.S.P. _____ 2.67
Magnesium stearate, U.S.P. _____ 0.83

The lactose, cornstarch and gelatin is granulated in the conventional manner. To the milled dry granulation is added the PPH together with magnesium stearate. The combination is thoroughly dry mixed and compressed into tablets weighing 175.0 mg.

C. Ointment: Mg./gm.
PPH _____ 25.0
Methyl paraben, U.S.P. _____ 1.8
Propyl paraben, U.S.P. _____ 0.2
Petrolatum, U.S.P. _____ 973.0

Dissolve the parabens in the melted petrolatum. Stir until cool and add the PPH. Disperse by mixing and mill the dispersed ointment on a three roller mill.

D. Cream: Mg./Gm.
PPH _____ 25.0
Hydrophilic ointment, U.S.P. _____ 975.0

Incorporate the PPH in the hydrophilic ointment and mill the product until smooth.

E. Coated tablets:

Tablets are prepared and compressed in the manner listed under B using deep concave punches. The concave tablets are coated with sugar in the usual manner.

The dosage forms shown are merely representative of the type. It is to be understood that salts other than the perphenazine salt of prednisolone hemisuccinate may be incorporated into such forms such as the salts mentioned earlier in the specification.

I claim:

1. A novel salt consisting of a steroid hemiester having the formula:

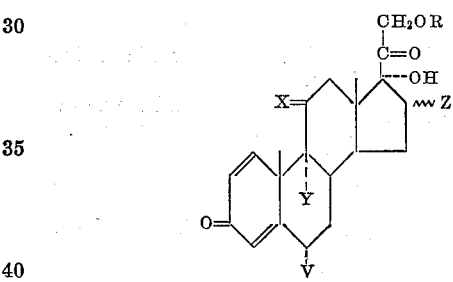

wherein X is a member of the group consisting of O and (H, βOH), Y is a member of the group consisting of H and F, R is a polybasic acid radical having a free acid group selected from the group consisting of sulfuric, phosphoric and dicarboxylic acids having up to eight carbon atoms, V is a member of the group consisting of H and methyl, Z is a member of the group consisting of H, methyl and α-OH with at least one of the group V and Z being H, and the 1,2-dihydro analogs thereof, in combination with a phenothiazinyl alkylamine having the formula:

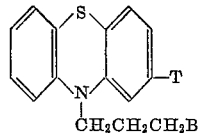

wherein T is a member of the group consisting of hydrogen, halogen, lower alkanoyl and trifluoromethyl and B is an amino radical of the group consisting of lower dialkylamino. N - methylpiperazino, N - hydroxyethylpiperazino and N-acetoxyethylpiperazino.

2. Novel salts having the formula:

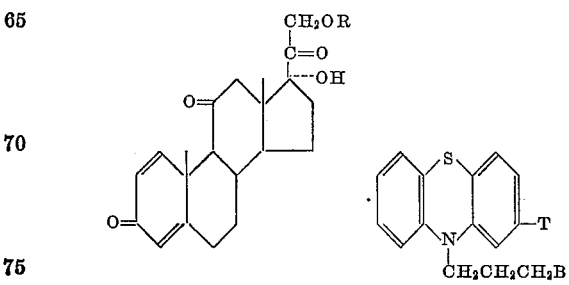

wherein R is a dicarboxylic acid having up to eight carbon atoms, T is a halogen and B is N-hydroxyethylpiperazino.

3. Novel salts having the formula:

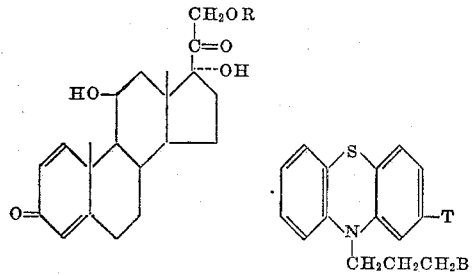

wherein R is a dicarboxylic acid having up to eight carbon atoms, T is a halogen and B is N-hydroxyethylpiperazino.

4. Compounds of the formula of claim 3 wherein B is methylpiperazino and R and T are as defined.

5. Compounds of the formula of claim 3 wherein B is N-methylpiperazino and R and T are as defined.

6. The 1-(2-hydroxyethyl)-4-[3-(2-chloro-10-phenothiazinyl)propyl]piperazine salt of prednisolone 21- hemisuccinate.

7. The 1-(2-hydroxyethyl)-4-[3-(2-chloro-10-phenothiazinyl)propyl]piperazine salt of prednisone 21-hemisuccinate.

8. The 1-(2-hydroxyethyl)-4-[3-(2-chloro-10-phenothiazinyl)propyl]piperazine salt of 9α-fluoro-16α-methylprednisolone 21-hemisuccinate.

9. The 1-methyl-4-[3-(2-chloro-10-phenothiazinyl)propyl] piperazine salt of prednisone 21-o-sulfobenzoate.

10. The 1-methyl-4-[3-(2-chloro-10-phenothiazinyl)-propyl] piperazine salt of prednisolone 21-o-sulfobenzoate.

11. The 1-(2-hydroxyethyl)-4-[3-(2-chloro-10-phenothiazinyl)propyl] piperazine salt of prednisolone 21-dihydrogen phosphate.

12. The 2-chloro-10-(3-dimethylaminopropyl) phenothiazine salt of hydrocortisone 21-dehydrogen phosphate.

13. In the process for preparing the compounds of claim 1, the step which comprises admixing substantially equimolar quantities of the components whose formulae are shown in claim 1, in a solvent in which the salt product is essentially insoluble.

14. The process of claim 13 wherein perphenazine and prednisolone 21-hemisuccinate are admixed in aqueous medium.

15. Novel salts having the formula:

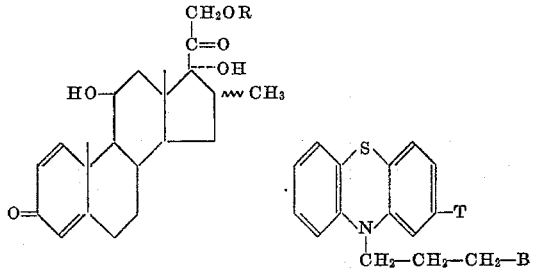

wherein R is a polybasic acid radical of a dicarboxylic acid having up to eight carbon atoms, T is a halogen and B is N-hydroxyethylpiperazino.

16. Novel salts having the forumla:

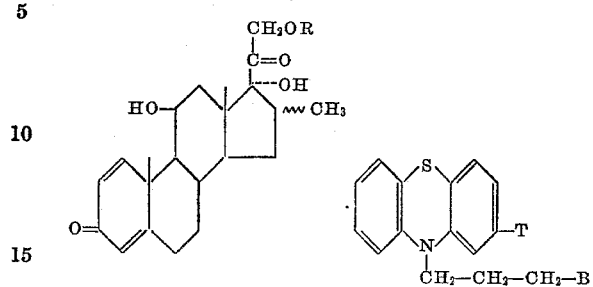

wherein R is a polybasic acid radical of a dicarboxylic acid having up to eight carbon atoms, T is a halogen and B is methylpiperazino.

17. Novel salts having the formula:

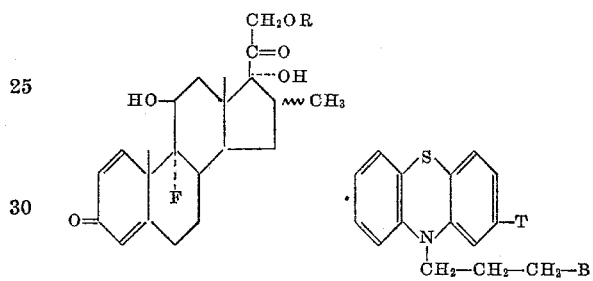

wherein R is a polybasic acid radical of a dicarboxylic acid having up to eight carbon atoms, T is a halogen and B is N-hydroxyethylpiperazino.

18. Novel salts having the formula:

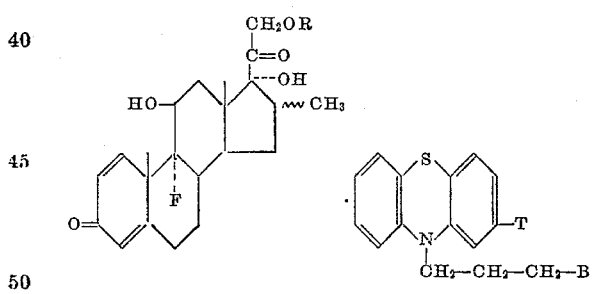

wherein R is a polybasic acid radical of a dicarboxylic acid having up to eight carbon atoms, T is a halogen and B is methylpiperazino.

References Cited in the file of this patent

UNITED STATES PATENTS

| | | |
|---|---|---|
| 2,708,651 | Laubach | May 17, 1955 |
| 2,786,835 | Pinson | Mar. 26, 1957 |
| 2,871,160 | Johnson et al. | Jan. 27, 1959 |

OTHER REFERENCES

Clinical Medicine, vol. 3, pages 948-9 (October 1956).